US010270901B2

(12) United States Patent
Li et al.

(10) Patent No.: US 10,270,901 B2
(45) Date of Patent: Apr. 23, 2019

(54) MESSAGE PROMPTING METHOD AND MESSAGE PROMPTING APPARATUS

(71) Applicant: Yulong Computer Telecommunication Scientific (Shenzhen) Co., Ltd., Shenzhen (CN)

(72) Inventors: Jiajun Li, Shenzhen (CN); Deying Guo, Shenzhen (CN)

(73) Assignee: Yulong Computer Telecommunication Scientific (Shenzhen) Co., Ltd., Shenzhen (CN)

(*) Notice: Subject to any disclaimer, the term of this patent is extended or adjusted under 35 U.S.C. 154(b) by 81 days.

(21) Appl. No.: 15/111,886

(22) PCT Filed: Jan. 15, 2014

(86) PCT No.: PCT/CN2014/070633
§ 371 (c)(1),
(2) Date: Jul. 15, 2016

(87) PCT Pub. No.: WO2015/106397
PCT Pub. Date: Jul. 23, 2015

(65) Prior Publication Data
US 2016/0330313 A1    Nov. 10, 2016

(51) Int. Cl.
*H04M 1/725*        (2006.01)
*H04L 12/58*        (2006.01)
*G06F 3/0484*       (2013.01)

(52) U.S. Cl.
CPC .... *H04M 1/72586* (2013.01); *G06F 3/04845* (2013.01); *H04L 51/24* (2013.01);
(Continued)

(58) Field of Classification Search
CPC ......... H04M 1/72586; H04M 1/72547; H04M 1/72552; H04M 2201/42; H04L 51/24; G06F 3/04845
See application file for complete search history.

(56) References Cited

U.S. PATENT DOCUMENTS

2005/0268237 A1   12/2005   Crane et al.
2010/0185980 A1    7/2010   Kuo
(Continued)

FOREIGN PATENT DOCUMENTS

CN    101674372    3/2010
CN    102291497   12/2011
(Continued)

OTHER PUBLICATIONS

Sarah Guarino, How-to: Customize and use Notification Center in iOS 7, Oct. 10, 2013, www.9To5Mac.com.*
(Continued)

*Primary Examiner* — George Eng
*Assistant Examiner* — Hung K Du
(74) *Attorney, Agent, or Firm* — Bond Schoeneck & King, PLLC; George McGuire

(57) ABSTRACT

The present disclosure provides a message prompting method and a message prompting device. The message prompting method includes: displaying new notification messages of preset applications at a head of a message queue on a tray interface of a terminal. Through a technical solution of the present disclosure, notification messages of the preset applications are displayed on the head of the tray interface of the terminal for convenience of viewing, thereby not only ensuring no important notification message being missed, but also satisfying needs of individual users for personalized settings of tray notification.

14 Claims, 5 Drawing Sheets

(52) U.S. Cl.
CPC ... *H04M 1/72547* (2013.01); *H04M 1/72552* (2013.01); *H04M 2201/42* (2013.01)

(56) References Cited

U.S. PATENT DOCUMENTS

| | | | | |
|---|---|---|---|---|
| 2012/0047460 | A1* | 2/2012 | McCann | G06F 3/04812 |
| | | | | 715/809 |
| 2012/0124477 | A1* | 5/2012 | Edgar | G06Q 10/10 |
| | | | | 715/738 |
| 2013/0007665 | A1 | 1/2013 | Chaudhri et al. | |
| 2013/0024815 | A1 | 1/2013 | O | |
| 2013/0097513 | A1* | 4/2013 | Adarraga | H04L 65/403 |
| | | | | 715/736 |
| 2013/0346882 | A1 | 12/2013 | Shiplacoff et al. | |
| 2014/0179377 | A1* | 6/2014 | Song | H04W 4/20 |
| | | | | 455/566 |
| 2014/0189533 | A1* | 7/2014 | Krack | G06F 3/0481 |
| | | | | 715/753 |
| 2015/0262583 | A1* | 9/2015 | Kanda | H04N 5/232 |
| | | | | 704/275 |

FOREIGN PATENT DOCUMENTS

| | | |
|---|---|---|
| CN | 102625988 | 8/2012 |
| CN | 102752450 | 10/2012 |
| CN | 102752450 A | 10/2012 |
| TW | 201028909 A | 8/2010 |

OTHER PUBLICATIONS

International Search Report of International Application No. PCT/CN2014/070633 dated Oct. 22, 2014.
Supplementary European Search Report dated Sep. 25, 2017, EPO Form 1503 and EPO Form 1703, Application No. PCT/CN2014070633, pp. 1-8.
Chinese Office Action dated Mar. 29, 2018.

* cited by examiner

MESSAGE PROMPTING METHOD AND MESSAGE PROMPTING APPARATUS

CROSS REFERENCE TO RELATED APPLICATION

The present application is the U.S. National Stage application under 35 U.S.C. 371 of PCT Application No. PCT/CN2014/070633, filed Jan. 15, 2014, the entirety of which is hereby incorporated by reference.

TECHNICAL FIELD

The present disclosure relates to a technical field of communications, and particularly relates to a message prompting method and a message prompting device.

BACKGROUND

As more and more applications of a mobile phone appear, message notification functions of various applications are also gradually improved. More and more messages pushed by service remind a user to view and use, and are displayed on a tray interface of the terminal. However, notifications of missed calls, unread information, memorandum or other transactions on the terminal are also displayed on the tray interface of the terminal.

In an existing technology, a display mode of message notifications on the tray interface of the terminal is to order message notifications successively according to receiving time of the notifications. Important notification information may be arranged at a bottom of the tray interface of the terminal due to their earlier prompting time, and message notifications the user intended to view may be arranged in any position of the tray interface, causing inconvenience for viewing. A full scale clearance function may be used after the user views too many pieces of notification, and some important notification may be eliminated, causing important notification information being missed.

Therefore, how to display message notification of applications on the tray interface according to a preset mode becomes a technical problem urgently to be solved.

SUMMARY

Based on above technical problems, the present disclosure proposes a new message prompting method capable of displaying notification messages of preset applications at a head of a tray interface of a terminal for convenience of viewing, thereby not only ensuring no important notification message being missed, but also satisfying needs of individual users for personalized settings of tray notification.

In view of this, according to one aspect of the present disclosure, a message prompting method is provided, including: displaying new notification messages of preset applications at a head of a message queue on a tray interface of a terminal.

Through the technical solution, the notification messages on the tray interface are not displayed time-sequentially, while the notification messages of the preset applications are displayed at the head of the tray interface, and the notification messages of other applications are arranged in a certain order below the notification messages of the preset applications. When opening the tray interface, the user can first view the notification messages of the preset applications for ensuring no important information being missed.

The preset applications can be partially set by manufacturers during dispatching from a factory or set by the user according to actual use conditions of the applications. For example: calls and short messages are set by the manufacturers as preset applications and are displayed at the head of the tray interface, while an alarm clock application can also be set by the user as a preset application.

In the above technical solution, optionally, the method also includes counting message viewing frequency of other applications excluding the preset applications; and displaying the new notification messages of other applications, of which the message viewing frequencies are greater than or equal to a preset frequency value, on the tray interface.

Through the technical solution, the message viewing frequency represents a degree of attention of the user to the applications. The higher the message viewing frequency is, the higher the degree of attention is. Therefore, the notification messages of the applications, of which the message viewing frequencies are greater than or equal to a preset frequency value, are displayed on the tray interface, i.e., preferentially prompting the user to view new notification messages of concerned applications, and the preset frequency value can be adjusted freely. For example: if a preset frequency value is 2/day, the notification messages of the applications, the number of usage times of which is greater than or equal to 2 within one day, are displayed on the tray interface. Accordingly, the notification messages of applications, of which the message viewing frequency is less than the preset frequency value, are not displayed. The mode can reduce the number of the notification messages on the tray interface and eliminate interference formed by the notification messages of the applications, of which the usage frequency is low, on the tray display interface.

In the above technical solution, optionally, a selecting interface is provided for the user to select a ordering rule; according to the ordering rule selected by the user, the new notification messages of other applications are ordered; and an ordering rule of the new notification messages of the preset applications is different from an ordering rule of the new notification messages of other applications.

Through the technical solution, ordering rule for the notification messages of the preset applications and ordering rule for the notification messages of other applications may be set respectively. For example, preset applications are a call and a short message, and according to a fixed order: the call is arranged at the first place of a queue and then the short message is arranged at the second place; however, the notification messages of other applications can be arranged according to the usage frequency or a reception order. Although ordering modes are different, the notification messages of the preset applications are displayed in front of the notification messages of other applications in the tray interface.

In the above technical solution, optionally, the ordering rule includes at least one of: a chronological order, a message viewing frequency order, an importance level order and an application usage frequency order.

Those skilled in the art should understand that for the display mode of the notification messages, many other ordering modes also exist and the above technical solution is not used for specific limitation. For example, in some other technical means, the ordering rule can also be based on the quantity of the notification messages or a customized order for display.

In the above technical solution, optionally, the method also includes: highlighting and/or magnifying the new notification messages of the preset applications.

Through the technical solution, highlighting and/or magnifying the new notification messages of the preset applications may enable the notification messages of the preset applications to be more conspicuous, easily attract the user when opening the tray interface and not easily be missed.

According to another aspect of the present disclosure, a message prompting device is also provided, including: a display unit used for displaying new notification messages of preset applications at a head of a message queue on a tray interface of a terminal.

Through the technical solution, the notification messages on the tray interface are not displayed time-sequentially, while the notification messages of the preset applications are displayed on the head of the tray interface, and the notification messages of other applications are arranged in a certain order after the notification messages of the preset applications. When opening the tray interface, the user can first view the notification messages of the preset applications for ensuring no important information being missed.

Where the preset applications can be partially set by manufacturers during dispatching from a factory or set by the user according to actual use conditions of the applications. For example: calls and short messages are set by the manufacturers as preset applications and are displayed on the head of the tray interface, while an alarm clock application can also be set by the user as a preset application.

In the above technical solution, optionally, the message prompting device also includes: a counting unit connected to the display unit and used for counting message viewing frequency of other applications; and the display unit also includes: a filtering unit used for displaying the new notification messages of other applications, of which the message viewing frequencies are greater than or equal to a preset frequency value, on the tray interface.

The message viewing frequency represents a degree of attention of the user to the applications. The higher the message viewing frequency is, the higher the degree of attention is. Therefore, the notification messages of the applications, of which the message viewing frequencies are greater than or equal to a preset frequency value, are displayed on the tray interface, i.e., preferentially prompting the user to view new notification messages of the concerned applications, and the preset frequency value can be adjusted freely. For example: if a preset frequency is using twice per day, the notification messages of the applications, which are used twice or more per day, are displayed on the tray interface. Accordingly, the notification messages of the applications, of which the message viewing frequencies are less than the preset frequency value, are not displayed. The mode can reduce the quantity of the notification messages on the tray interface and eliminate interference formed by the notification messages of applications, of which the usage frequency is low, on the tray display interface.

In the above technical solution, optionally, the message prompting device also includes a selecting unit used for providing a selecting interface for a user to select a required ordering rule, and an ordering unit used for ordering the new notification messages of other applications according to the ordering rule selected by the user.

An ordering rule of the new notification messages of the preset applications is different from an ordering rule of the new notification messages of other applications.

Through the technical solution, ordering rules can be respectively set for the notification messages of the preset applications and the notification messages of other applications. For example, preset applications are a call and a short message, and according to a fixed order: the call is arranged at the first place of a queue and then the short message is arranged at a second place; however, the notification messages of other applications can be arranged according to the usage frequency or a reception order. Although ordering modes are different, it is ensured that in the tray interface, the notification messages of the preset applications are displayed in front of the notification messages of other applications.

In the above technical solution, optionally, the ordering rule includes at least one of: a chronological order, a message viewing frequency order, an importance level order and an application usage frequency order.

Those skilled in the art should understand that many other ordering modes for displaying notification messages also exist and the above technical solutions are not specific limitation. For example, in some other technical means, the ordering rule can also be an order according to the quantity of the notification messages or a customized order for display.

In the above technical solution, optionally, the display unit is also used for highlighting and/or magnifying the new notification messages of the preset applications.

Through the technical solution, highlighting and/or magnifying the notification messages of the preset applications may enable the notification messages of the preset applications to be more conspicuous, easily attract the user when opening the tray interface and not easily be missed.

According to yet another aspect of the present disclosure, a program product stored on a non-volatile machine readable medium is also provided and used for prompting the messages. The program product includes a machine executable instruction enabling a computer system to execute the following step: displaying the new notification messages of the preset applications at a head of a message queue on a tray interface of a terminal.

According to yet another aspect of the present disclosure, a non-volatile machine readable medium is also provided and used for storing the program product for prompting notification messages. The program product includes a machine executable instruction enabling a computer system to execute the following step: displaying the new notification messages of the preset applications at a head of a message queue on a tray interface of a terminal.

According to still another aspect of the present disclosure, a machine readable program is also provided and the program enables a machine to execute the message prompting method of any of the above technical solutions.

According to still another aspect of the present disclosure, a storage medium in which a machine readable program is stored is also provided, and the machine readable program enables a machine to execute any message prompting method of the above technical solutions.

DETAILED DESCRIPTION

To understand above purposes, features and advantages of the present disclosure more clearly, the present disclosure is further described in detail below in combination with drawings and specific embodiments. It should be explained that embodiments in the present application and the features in the embodiments can be mutually combined without conflict.

Many details are elaborated in the following description for convenience of understanding the present disclosure. However, the present disclosure can also be implemented in other modes different from those described herein. Therefore, a protection scope of the present disclosure is not limited by specific embodiments disclosed below.

Figure 1:
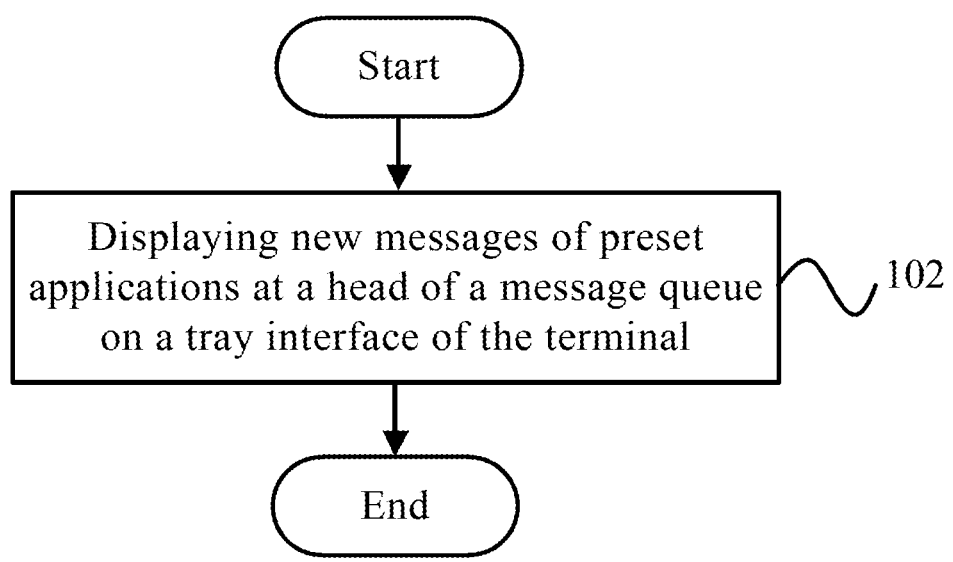
FIG. 1 shows a flow chart of a message prompting method according to an embodiment of the present disclosure.

FIG. 1 shows a flow chart of a message prompting method according to an embodiment of the present disclosure.

As shown in FIG. 1, the message prompting method according to embodiments of the present disclosure may include the following step: step 102: displaying new notification messages of preset applications at a head of a message queue on a tray interface of a terminal.

Through the technical solution, the notification messages on the tray interface are not displayed time-sequentially, while the notification messages of the preset applications are displayed on the head of the tray interface, and the notification messages of other applications are arranged in a certain order after the notification messages of the preset applications. When opening the tray interface, the user can first view the notification messages of the preset applications for ensuring no important information is missed.

The preset applications can be partially set by manufacturers during dispatching from a factory or set by the user according to actual use conditions of the applications. For example: calls and short messages are set by the manufacturers as preset applications and are displayed on the head of the tray interface, while an alarm clock application can also be set by the user as a preset application.

In the above technical solution, optionally, the method also includes counting message viewing frequency of other applications excluding the preset applications; and displaying the new notification messages of other applications, of which the message viewing frequencies are greater than or equal to a preset frequency value, of other applications on the tray interface.

Through the technical solution, the message viewing frequency represents a degree of attention of the user to the applications. The higher the message viewing frequency is, the higher the degree of attention is. Therefore, the notification messages of the applications, of which the message viewing frequencies are greater than or equal to a preset frequency value, are displayed on the tray interface, i.e., preferentially reminding the user about new notification messages of the concerned applications, and the preset frequency value can be adjusted freely. For example: if a preset frequency is using twice per day, the notification messages of the applications, which are used twice or more within one day, are displayed on the tray interface. Accordingly, the notification messages of the applications, of which the message viewing frequencies are less than the preset frequency value, are not displayed. The mode can reduce the quantity of the notification messages on the tray interface and eliminate interference formed by the notification messages of the applications, of which the use frequencies are low, on the tray display interface.

In the above technical solution, optionally, a selecting interface is provided for the user to select an ordering rule; according to the ordering rule selected by the user, the new notification messages of other applications are ordered; and an ordering rule of the new notification messages of the preset applications is different from an ordering rule of the new notification messages of other applications.

Through the technical solution, ordering rules can be respectively set for the notification messages of the preset applications and the notification messages of other applications. For example, preset applications are a call and a short message, and according to a fixed order: the call is arranged at the foremost end of a queue and then the short message is arranged; however, the notification messages of other applications can be arranged according to the usage frequency or a reception order. Although ordering modes are different, it is ensured that in the tray interface, the notification messages of the preset applications are displayed in front of the notification messages of other applications.

In the above technical solution, optionally, the ordering rule includes at least one of: a chronological order, a message viewing frequency order, an importance level order and an application usage frequency order.

Those skilled in the art should understand that many other ordering modes for displaying the notification messages also exist and the above technical solution is not used for specific limitation. For example, in some other technical means, the ordering rule can also be in an order of the quantity of the notification messages or a self-customized order for display.

In the above technical solution, optionally, the method also includes: highlighting and/or magnifying the new notification messages of the preset applications.

Through the technical solution, highlighting and/or magnifying and displaying the notification messages of the preset applications may enable the notification messages of the preset applications to be more conspicuous, easily attract the user in opening the tray interface and difficulty to be missed.

The ordering rule and the message prompting method of the tray interface are further illustrated below in combination with FIG. 2 to FIG. 4.

Figure 2:
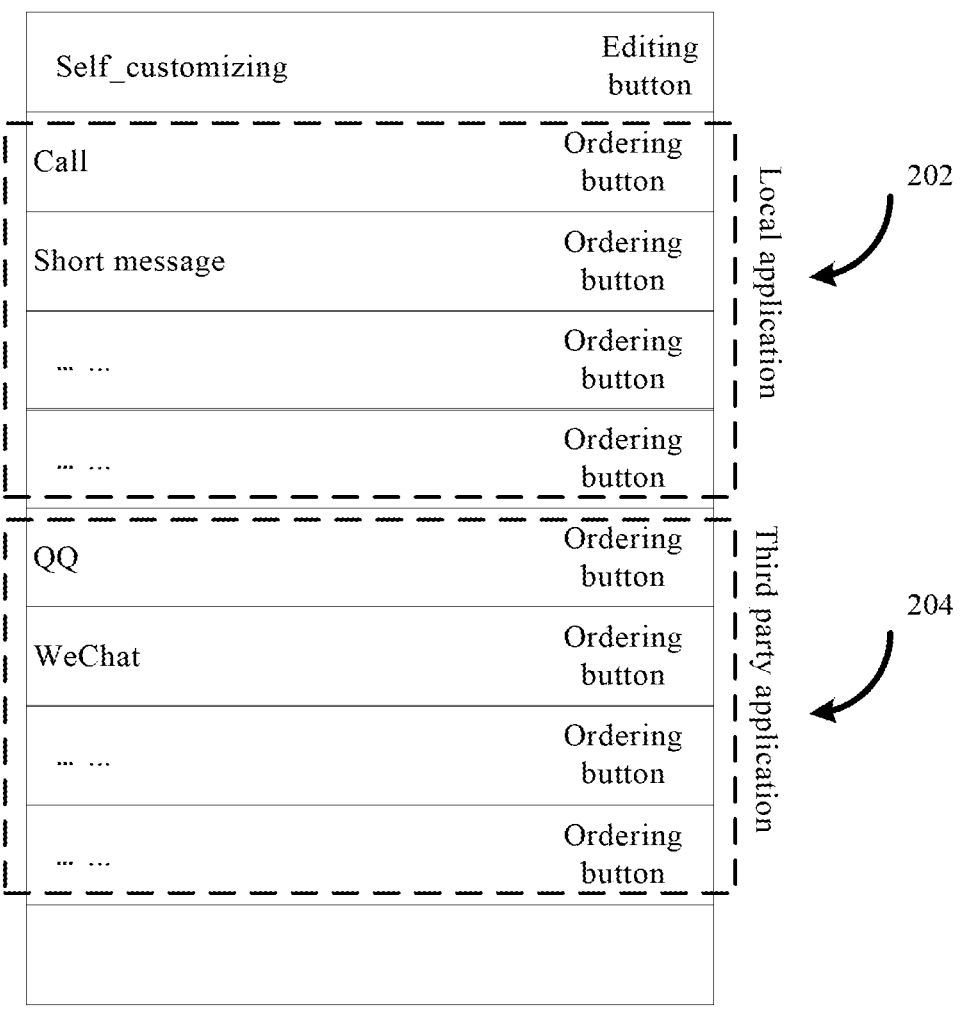
FIG. 2 shows a schematic diagram of a selecting interface for customizing a message prompting order according to an embodiment of the present disclosure.

FIG. 2 shows a schematic diagram of a selecting interface for customizing a message prompting order according to an embodiment of the present disclosure.

As shown in FIG. 2, the applications of the tray interface can be divided into two portions: local applications 202, where most of applications in the portion are system default applications, but the user can customize a display order of the notification messages thereof; and third party applications 204, where the third party applications are application services installed by the user and provided by third parties; a display order of the notification messages thereof can also be customized by the user; the ordering rule of the notification messages of the third party applications may be different from the ordering rule of the preset applications, but the notification messages of the preset applications are displayed in front of the notification messages of the third party applications.

Figure 3:
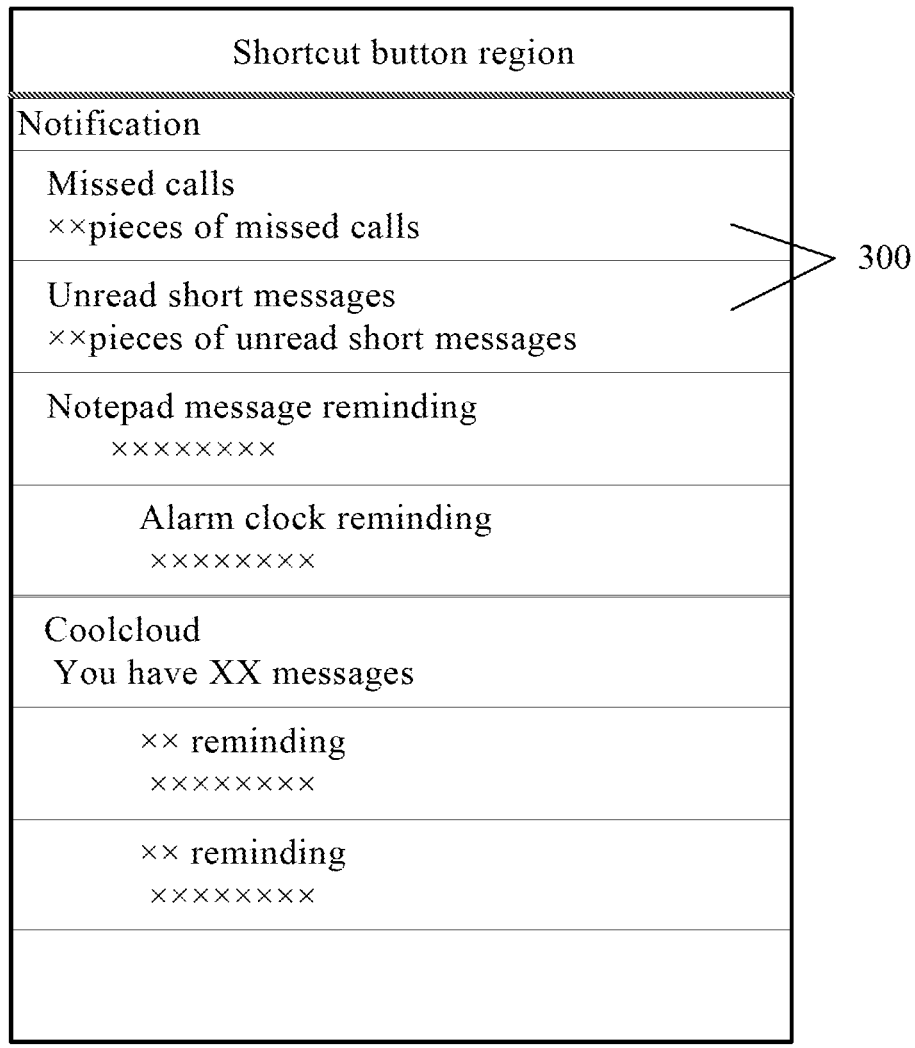
FIG. 3 shows a schematic diagram of a tray interface according to an embodiment of the present disclosure.

FIG. 3 shows a schematic diagram of a tray interface according to an embodiment of the present disclosure.

As shown in FIG. 3, after the user selects the ordering rule for defining the display mode of the notification messages on the tray interface, a terminal receives the notification messages of the applications, and orders and displays the notification messages in accordance with the selected rule. The notification messages of the preset application 300 are displayed at the head; meanwhile, first few application notifications on the tray interface are displayed on a signal status bar; and an order of notifications on the signal status bar keeps consistent with an order of notifications on the tray interface.

In FIG. 3, a call application and a short message application are important applications set by the user. When the two applications receive the new notification messages, the new notification messages are displayed on a top of the tray interface. In this way, important messages are quickly noticed by the user in numerous message prompts. Other applications, e.g., a notepad and an alarm clock, are not set as important applications by the user, and are called as other applications here. The ordering rule of other applications may be displaying in an order based on receiving time of the messages, or in an order of usage frequency of the applications.

Because a region of the tray interface is limited, when more applications receive new notification messages, the new notification messages of the applications, of which the message viewing frequencies are greater than a preset value, are displayed on the tray interface; and after new information of one application is viewed by the user, new notification messages not displayed are supplemented.

Figure 4:
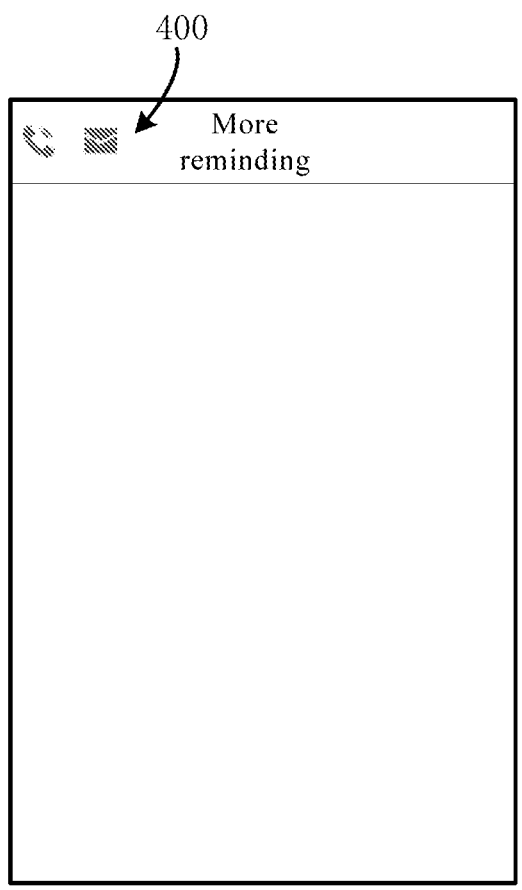
FIG. 4 shows a schematic diagram of notification of a signal status bar according to an embodiment of the present disclosure.

FIG. 4 shows a schematic diagram of notification of a signal status bar according to an embodiment of the present disclosure.

As shown in FIG. 4, when notification messages exist on the tray interface, the signal status bar 400 displays icons of the notification messages at a head of the tray interface for reminding the user. For example: if missed calls and unread short messages (as shown in FIG. 3) are displayed at the head of the tray interface, the signal status bar 400 first displays a call icon and then displays an information icon for prompting the user that the tray interface has missed calls and unread short messages.

That is, if the important applications set by the user receive the new notification messages, corresponding prompt icons can be displayed on the signal status bar for convenience of the user to pull down the tray interface to view. After the messages are viewed, the viewed messages are not displayed and other unread notification messages are supplemented.

Figure 5:
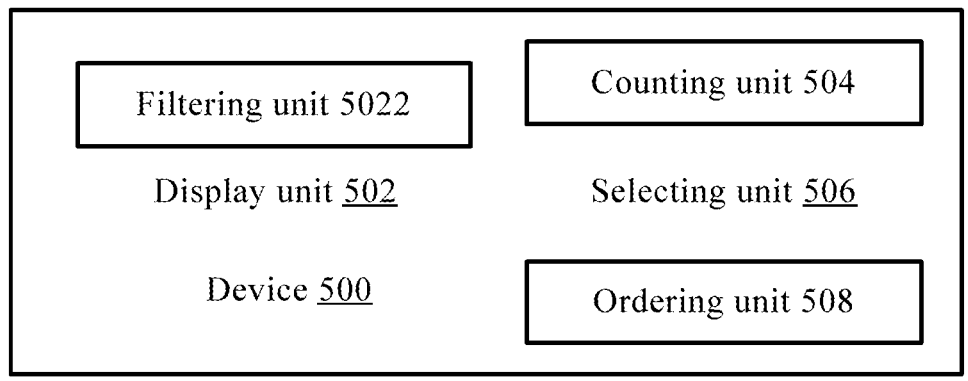
FIG. 5 shows a block diagram of a message prompting device according to an embodiment of the present disclosure.

FIG. 5 shows a block diagram of a device according to an embodiment of the present disclosure.

As shown in FIG. 5, the device 500 according to an embodiment of the present disclosure includes: a display unit 502 used for displaying new notification messages of preset applications at a head of a message queue on a tray interface of a terminal.

Through the technical solution, the notification messages on the tray interface are not displayed in chronological order, while the new notification messages of the preset applications are displayed on the head of the tray interface, and the notification messages of other applications are arranged in a certain order below the notification messages of the preset applications. When opening the tray interface, the user can first view the notification messages of the preset applications for ensuring no important information being missed.

The preset applications can be partially set by manufacturers during dispatching from a factory or set by the user according to actual use conditions of the applications. For example: calls and short messages are set by the manufacturers as preset applications and are displayed on the head of the tray interface, while an alarm clock application can also be set by the user as a preset application.

In the above technical solution, optionally, the device 500 also includes a counting unit 504. The counting unit 504 is connected to the display unit 502 and used for counting message viewing frequency of the new notification messages of other applications The display unit 502 also includes a filtering unit 5022. The filtering unit is used for displaying the new notification messages, of which the message viewing frequency is greater than or equal to a preset frequency value, of other applications on the tray interface.

The message viewing frequency represents a degree of user's attention to the applications. The higher the message viewing frequency is, the higher the degree of attention is. Therefore, the notification messages of the applications, of which the message viewing frequencies are greater than or equal to a preset frequency value, are displayed on the tray interface, preferentially reminding the user about new notification messages of the concerned applications, and the preset frequency value can be adjusted freely. For example: if a preset frequency is using twice within one day, the notification messages of the applications, which are used twice or more within one day, are displayed on the tray interface. Accordingly, the notification messages of the applications, of which the message viewing frequencies are smaller than the preset frequency value, are not displayed. The mode can reduce the quantity of the notification messages on the tray interface and eliminate interference formed by the notification messages, of which the usage frequency is low, of the applications on the tray display interface.

In the above technical solution, optionally, the device 500 also includes a selecting unit 506 and an ordering unit 508. The selecting unit is used for providing a selecting interface for a user to select a required ordering rule The ordering unit 508 is used for ordering the new notification messages of other applications according to the ordering rule selected by the user, and the ordering rule of the new notification messages of the preset applications is different from the ordering rule of the new notification messages of other applications.

Ordering rules can be respectively set for the notification messages of the preset applications and the notification messages of other applications. For example, a call and a short message are set as preset applications, and are displayed according to a fixed order: the call is arranged at the foremost end of a queue and then the short message is arranged; the notification messages of other applications can be arranged according to the usage frequency or a reception order. Although ordering modes are different, it is ensured that in the tray interface, the notification messages of the preset applications are displayed in front of the notification messages of other applications.

In the above technical solution, optionally, the ordering rule includes at least one of: a chronological order, a message viewing frequency order, an importance level order and an application usage frequency order.

Through the technical solution, the user can flexibly select at least one of the following display modes for the notification messages of the applications: a receiving time order for display, a message viewing frequency order for display, an importance level order for display and an application usage frequency order for display.

Those skilled in the art should understand that for the display mode of the notification messages, many other ordering modes also exist and the above technical solution is not used for specific limitation. For example, in some other technical means, the ordering rule can also be in an order of the quantity of the notification messages or as customized order for display.

In the above technical solution, optionally, the display unit is also used for highlighting and/or magnifying and displaying the new notification messages of the preset applications.

Through the technical solution, highlighting and/or magnifying, and displaying the notification messages of the preset applications may enable the notification messages of the preset applications to be more conspicuous, easily attract the user in opening the tray interface and be difficult to be missed.

Figure 6:
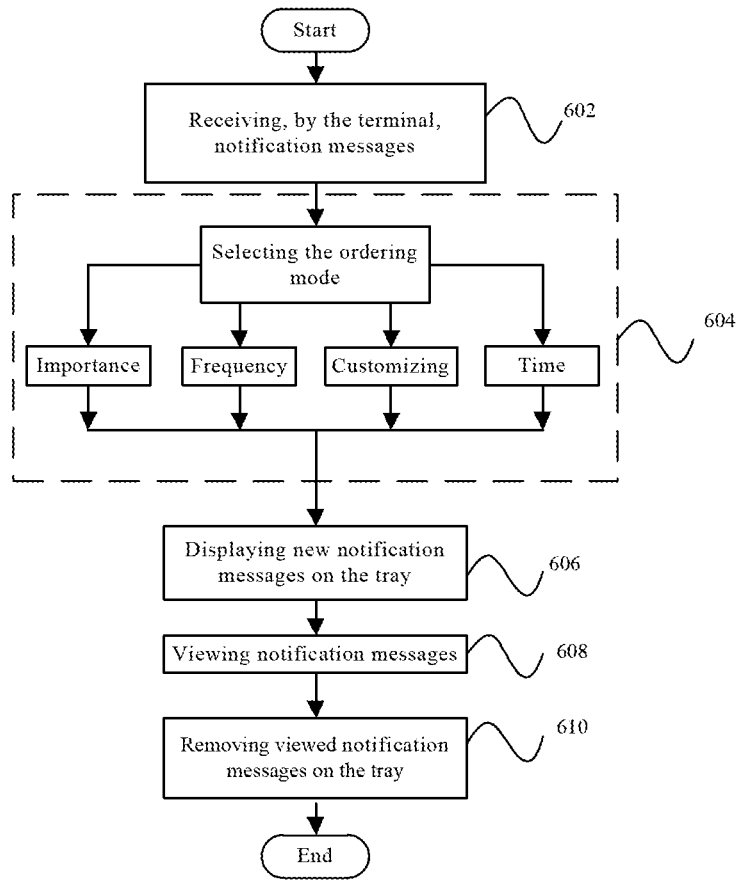
FIG. 6 shows a flow chart of a message prompting method according to another embodiment of the present disclosure.

FIG. 6 shows a flow chart of a message prompting method according to an embodiment of the present disclosure.

As shown in FIG. 6, steps for setting, displaying and receiving message prompting of the tray interface of the terminal are as follows:

Step 602: receiving, by the terminal, information. Many notification messages may be received, e.g.: a call, a short message, a notepad, QQ, WeChat, E-main, etc.

Step 604: ordering the notification messages, i.e., ordering the received notification messages according to the ordering mode set by the user. The ordering rule includes but not limited to: an importance level order, a usage frequency order, a customized order and a receiving time order.

Step 606: conducting message prompting on the tray interface according to the set ordering mode.

Step 608: viewing the messages, i.e., viewing the notification messages on the tray interface after the user views the message prompting.

Step 610: removing the notification messages from the tray interface after being viewed, and displaying unviewed notification messages sequentially.

According to embodiments of the present disclosure, a program product stored in a non-volatile machine readable medium is also provided and the program product is used for messages prompting. The program product includes a machine executable instruction used for enabling a computer system to execute the following step: displaying the new notification messages of the preset applications at a head of a message queue on a tray interface of a terminal.

According to embodiments of the present disclosure, a non-volatile machine readable medium is also provided and used for storing the program product for messages prompting. The program product includes a machine executable instruction used for enabling a computer system to execute the following step: displaying the new notification messages of the preset applications at a head of a message queue on a tray interface of a terminal.

According to embodiments of the present disclosure, a machine readable program is also provided and the program enables a machine to execute the message prompting method of any of the above technical solutions.

According to embodiments of the present disclosure, a storage medium in which a machine readable program is stored is also provided, where the machine readable program enables a machine to execute the message prompting method of any of the above technical solutions.

The technical solutions according to the present disclosure are described in detail above in combination with the drawings. By setting the display order of the notification messages on the tray interface, notification messages of the preset applications are displayed on the head of the tray interface of the terminal for convenience of viewing, thereby not only ensuring no important notification message missing, but also satisfying needs of individual users for personalized setting of tray notification.

The above description only describes embodiments of the present disclosure and is not intended to limit the present disclosure. For those skilled in the art, various variations and changes can be made to the present disclosure. Any modification, equivalent replacement, improvement, etc. made within a spirit and a principle of the present disclosure shall be contained within the protection scope of the present disclosure.

The invention claimed is:

1. A message prompting method, comprising:
    providing a selecting interface for a user to select an ordering rule for other applications excluding preset applications;
    ordering new notification messages of the other applications excluding the preset applications according to the ordering rule;
    displaying new notification messages of the preset applications at a head of a message queue on a tray interface of a terminal, and displaying the new notification messages of the other applications in the message queue after the new notification messages of the preset applications,
    wherein an ordering rule of new notification messages of the preset applications is different from the ordering rule of new notification messages of the other applications such that the new notification messages of the other applications excluding the preset applications are ordered according to a quantity of new notification messages of each of the other applications excluding the preset applications.

2. The message prompting method according to claim 1, further comprising:
    counting message viewing frequencies of the other applications excluding the preset applications; and
    displaying new notification messages of other applications, of which the message viewing frequencies are greater than or equal to a preset frequency value, on the tray interface.

3. The message prompting method according to claim 1, wherein the ordering rule comprises at least one of:
    a chronological order, a message viewing frequency order, an importance level order and an application usage frequency order.

4. The message prompting method according to claim 1, further comprising:
    highlighting and/or magnifying new notification messages of the preset applications.

5. The message prompting method according to claim 2, further comprising:
    highlighting and/or magnifying new notification messages of the preset applications.

6. The message prompting method according to claim 3, further comprising:
    highlighting and/or magnifying new notification messages of the preset applications.

7. The message prompting method according to claim 1, further comprising: displaying the new notification messages of the preset applications at a signal status bar, wherein the signal status bar is at a top region of a screen of the terminal.

8. The message prompting method according to claim 2, further comprising:
    removing the new notification message of one of the preset applications and the other applications, of which the message viewing frequencies are greater than or equal to a preset frequency value, after being viewed; and displaying new notification message of one of other applications, of which the message viewing frequencies are less than the preset frequency value, at an end of the message queue on the tray interface of the terminal.

9. A message prompting device, comprising: a processor and a memory storing instructions executably by the processor, wherein execution of the instructions by the processor causes the processor to:

provide a selecting interface for a user to select an ordering rule for other applications excluding preset applications;

order new notification messages of the other applications excluding the preset applications according to the ordering rule;

display new notification messages of the preset applications at a head of a message queue on a tray interface of a terminal, and displaying the new notification messages of the other applications in the message queue after the new notification messages of the preset applications, wherein an ordering rule of new notification messages of the preset applications is different from the ordering rule of new notification messages of the other applications such that the new notification messages of the other applications excluding the preset applications are ordered according to a quantity of new notification messages of each of the other applications excluding the preset applications.

10. The device according to claim 9, wherein the execution of the instructions by the processor further causes the processor to:

count message viewing frequencies of the other applications excluding the preset applications; and display new notification messages of other applications, of which the message viewing frequencies are greater than or equal to a preset frequency value, on the tray interface.

11. The device according to claim 9, wherein the ordering rule comprises at least one of:

a chronological order, a message viewing frequency order, an importance level order and an application usage frequency order.

12. The device according to claim 9, wherein the execution of the instructions by the processor further causes the processor to:

highlight and/or magnify new notification messages of the preset applications.

13. The device according to claim 9, wherein the execution of the instructions by the processor further causes the processor to: display the new notification messages of the preset applications at a signal status bar, wherein the signal status bar is at a top region of a screen of the terminal.

14. The device according to claim 10, wherein the execution of the instructions by the processor further causes the processor to:

removing the new notification message of one of the preset applications and the other applications, of which the message viewing frequencies are greater than or equal to a preset frequency value, after being viewed; and displaying new notification message of one of other applications, of which the message viewing frequencies are less than the preset frequency value, at an end of the message queue on the tray interface of the terminal.

* * * * *